(12) United States Patent
Zanarini et al.

(10) Patent No.: US 10,954,108 B2
(45) Date of Patent: Mar. 23, 2021

(54) MODIFIED VIDEO STREAM FOR SUPPORTING REMOTE CONTROL OF A CONTAINER CRANE

(71) Applicant: ABB Schweiz AG, Baden (CH)

(72) Inventors: Alessandro Zanarini, Baden (CH); Bjorn Holmberg, Uppsala (SE); Susanne Schmitt, Heidelberg (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/623,275

(22) PCT Filed: Jun. 12, 2018

(86) PCT No.: PCT/EP2018/065537
§ 371 (c)(1),
(2) Date: Dec. 16, 2019

(87) PCT Pub. No.: WO2018/229067
PCT Pub. Date: Dec. 20, 2018

(65) Prior Publication Data
US 2020/0207588 A1     Jul. 2, 2020

(30) Foreign Application Priority Data
Jun. 16, 2017   (EP) .................................. 17176351

(51) Int. Cl.
*B66C 13/08*     (2006.01)
*B66C 19/00*     (2006.01)

(52) U.S. Cl.
CPC ............. *B66C 13/08* (2013.01); *B66C 19/002* (2013.01); *B60R 2300/303* (2013.01)

(58) Field of Classification Search
CPC ........ B60R 2300/305; B60R 2300/202; B66C 13/08; B66C 19/002; G09B 9/05
See application file for complete search history.

(56) References Cited

U.S. PATENT DOCUMENTS

| | | | |
|---|---|---|---|
| 9,616,748 B2 * | 4/2017 | Tsubone | E02F 9/16 |
| 10,301,798 B2 * | 5/2019 | France | E02F 9/262 |

(Continued)

FOREIGN PATENT DOCUMENTS

| | | |
|---|---|---|
| CN | 101358936 A | 2/2009 |
| CN | 201762031 U | 3/2011 |

(Continued)

OTHER PUBLICATIONS

Chinese Office Action; Application No. 2018800388066; dated Jun. 22, 2020; 4 pages.

(Continued)

*Primary Examiner* — Timothy R Waggoner
(74) *Attorney, Agent, or Firm* — Whitmyer IP Group LLC

(57) ABSTRACT

A method for supporting remote control of a container crane, the container crane being configured to move containers from one location to another. The method is performed in a container crane control system, and includes the steps of: receiving work order information, each work order specifying a location of a container to be picked up and a destination of the container to be placed; obtaining a first video stream of images of a pick-up location; identifying the container to be picked up in the images of the first video stream; modifying the first video stream images, which includes highlighting the container to be picked up; and presenting the modified video stream of images on a display.

15 Claims, 4 Drawing Sheets

(56) References Cited

U.S. PATENT DOCUMENTS

| | | | | |
|---|---|---|---|---|
| 2010/0289899 | A1* | 11/2010 | Hendron | B60R 1/00 348/148 |
| 2014/0054254 | A1* | 2/2014 | Ogawa | B66C 13/40 212/276 |
| 2014/0188333 | A1* | 7/2014 | Friend | E02F 9/267 701/34.4 |
| 2015/0070387 | A1 | 3/2015 | Schmalstieg et al. | |
| 2016/0035251 | A1* | 2/2016 | Delplace | G09B 19/003 434/66 |
| 2020/0048052 | A1* | 2/2020 | Lyngback | B66C 13/46 |

FOREIGN PATENT DOCUMENTS

| | | |
|---|---|---|
| CN | 103818828 A | 5/2014 |
| CN | 105431370 A | 3/2016 |
| EP | 1748335 A2 | 1/2007 |
| JP | 2016193777 A * | 11/2016 ............ B66C 13/40 |
| KR | 20110043293 A | 4/2011 |
| KR | 20110066764 A | 6/2011 |
| KR | 20120050830 A | 5/2012 |
| KR | 20160013271 A | 2/2016 |
| WO | 2011108945 A2 | 9/2011 |
| WO | 2014053703 A1 | 4/2014 |
| WO | 2015022001 A1 | 2/2015 |

OTHER PUBLICATIONS

Translation of Korean Office Action Application No. 10-2020-7001192 dated Apr. 24, 2020 5 pages.

International Search Report and Written Opinion of the International Searching Authority Application No. PCT/EP2018/065537 Completed: Sep. 10, 2018; dated Sep. 18, 2018 12 pages.

Korean Office Action with Translation; Application No. 10-2020-7001192; dated Aug. 3, 2020; 10 Pages.

* cited by examiner

MODIFIED VIDEO STREAM FOR SUPPORTING REMOTE CONTROL OF A CONTAINER CRANE

TECHNICAL FIELD

The invention relates to a method, a container crane control system, a computer program and a computer program product for supporting remote control of a container crane by modifying a video stream.

BACKGROUND

Container cranes are used to handle freight containers, to transfer containers between transport modes at container terminals, freight harbors and the like. Standard shipping containers are used to transport a great and growing volume of freight around the world. Trans-shipment is a critical function in freight handling. Trans-shipment may occur at each point of transfer and there is usually a tremendous number of containers that must be unloaded, transferred to a temporary stack, and later loaded on to another ship, or back onto the same ship or loaded instead onto another form of transport.

Traditionally, the container cranes have been controlled in an operator cabin mounted on the container crane. Recently however, container cranes have become remote controlled. This allows an operator to sit in an office and control the crane. This has eliminated many situations in which port workers have been exposed to inconvenience, danger and even injury. Loading and unloading the ship is seen as a critical stage or a bottleneck in terms of freight handling as the ships are idle in port during the time that loading and/or unloading takes place. To reduce this idle time, the container cranes are normally run continuously on long shifts until the loading or unloading of each ship is completed. By allowing remote control, changeover time for operator changes (due to new shift, breaks, etc.) is greatly reduced.

Any improvement in the remote control interface for controlling a container crane is of great benefit for the efficiency of loading/unloading of containers.

SUMMARY

It is an object to improve efficiency of remote controlled container cranes.

According to a first aspect, it is provided a method for supporting remote control of a container crane, the container crane being configured to move containers from one location to another. The method is performed in a container crane control system, and comprises the steps of: receiving work order information, each work order specifying a location of a container to be picked up and a destination of the container to be placed; obtaining a first video stream of images of a pick-up location; identifying the container to be picked up in the images of the first video stream; modifying the first video stream images, which comprises highlighting the container to be picked up; and presenting the modified video stream of images on a display.

The step of modifying the first video stream images may comprise indicating the location of a subsequent container to be picked up.

The method may further comprise the step of: obtaining a second video stream. In such a case, the step of modifying the first video stream comprises combining the first video stream with at least part of the second video stream to a combined video stream, wherein the combined video stream allows containers to be seen which are blocked, in the first video stream, by a spreader of the container crane.

The step of modifying the first video stream may comprise making the spreader semi-transparent.

The step of modifying the first video stream images may comprise adding height information, indicating a height between the spreader and an object below.

The step of modifying the first video stream images may comprise adding wind information.

The step of modifying the first video stream images may comprise adding a trajectory recommendation of the spreader.

The step of modifying the first video stream images may comprise adding information about distance or key distances between the spreader and the container to be picked up.

The step of modifying the first video stream images may comprise highlighting corner casting holes of the container to be picked up.

The step of modifying the first video stream images may comprise highlighting a fixed structure matching predetermined criteria.

The step of modifying the first video stream images may comprise highlighting an anomaly compared to an expected structure.

The step of modifying the first video stream images may comprise highlighting moving objects.

According to a second aspect, it is provided a container crane control system for supporting remote control of a container crane. The container crane is configured to move containers from one location to another. The container crane control system comprises: a processor; and a memory storing instructions that, when executed by the processor, cause the container crane control system to: receive work order information, each work order specifying a location of a container to be picked up and a destination of the container to be placed; obtain a first video stream of images of a pick-up location; identify the container to be picked up in the images of the first video stream; modify the first video stream images, which comprises highlighting the container to be picked up; and present the modified video stream of images on a display.

According to a third aspect, it is provided a computer program for supporting remote control of a container crane, the container crane being configured to move containers from one location to another. The computer program comprises computer program code which, when run on a container crane control system causes the container crane control system to: receive work order information, each work order specifying a location of a container to be picked up and a destination of the container to be placed; obtain a first video stream of images of a pick-up location; identify the container to be picked up in the images of the first video stream; modify the first video stream images, which comprises highlighting the container to be picked up; and present the modified video stream of images on a display.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc.," are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on modifying a video stream used for remote control of a container crane. Specifically, information is added to the video stream, such as highlighting the next container to be picked up. Other data can also be added to the video stream. In this way, the remote control of the container crane is made much more efficient which reduces operation time and risk for making mistakes when moving containers.

Figure 1:
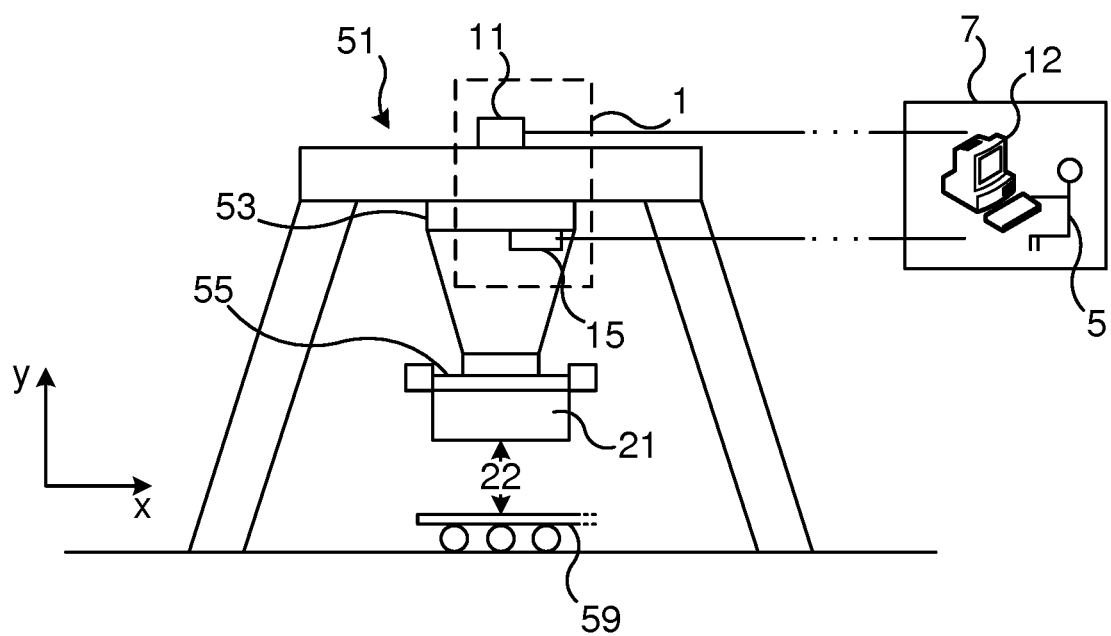
FIG. 1 is a schematic diagram illustrating a container crane environment in which embodiments presented herein can be applied.
Figure 2:
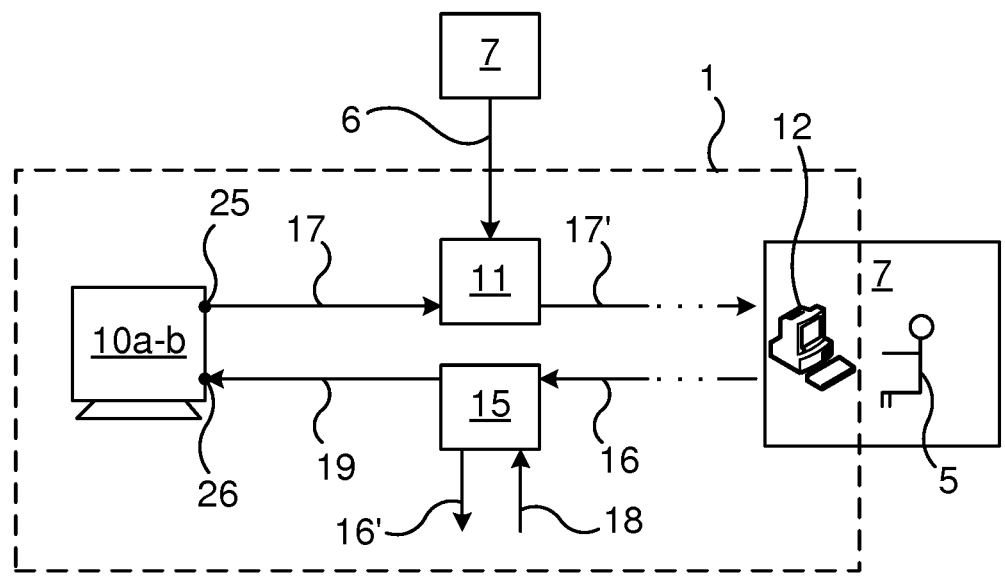
FIG. 2 is a schematic diagram illustrating a container crane control system of FIG. 1 according to one embodiment.

FIG. 1 is a schematic diagram illustrating a container crane environment in which embodiments presented herein can be applied and FIG. 2 is a schematic diagram illustrating a container crane control system of FIG. 1 according to one embodiment. A combined description with references to both FIG. 1 and FIG. 2 will now be presented. The view is along an x-y plane in a Cartesian coordinate system.

A container crane 51 uses a number of powerful electric motors mounted on a spreader 55 and on a trolley 53 to power moving parts and retract or extend cables to lift up or down the spreader 55. The spreader 55 can hold a load 21 in the form of a container. Electric motors are also used to power the movements of the trolley 53 holding the spreader 55, to lift and transport the containers out of the ship and onto a truck chassis 59 or a stack etc. The container crane 51 can be used for loading containers on a ship and/or for unloading containers from a ship to land.

The width of shipping containers is standardized at 8 ft. (2.436 m), but the height varies, typically between 8 ft. (2.436 m) and 9.5 ft. (2.896 m). The most common standard lengths are 20 ft. (6.096 m) and 40 ft. (12.192 m) long. The 40 ft. (12.192 m) container is very common today and even longer containers up to 53 ft. (16.154 m) long are also in use. International standard dimensions are based on a number of ISO recommendations made between 1968 and 1970, and in particular a recommendation R1161 from January 1970, which made recommendations about dimensions of corner fittings for standard containers. The distances between corner fittings on standard shipping containers are standardized in accordance with the ISO recommendations. The corner fittings, also known as corner castings, include standard openings so that a container may be picked up by inserting a hook or twistlock of the spreader 55 into each of the four corner fittings at the top of the container 21. The size and shape of the oval-shaped openings are defined in another standard, ISO 1161 from 1984. The same type of corner fittings, e.g. those on the bottom of a container, may be used to lock a container in place in a position (e.g. in a hold or on deck) on board a ship, on a wagon or a chassis.

The spreader 55 is thus used to grip the container 21 using hooks, twistlocks or other fittings to engage with the standard sized opening in the corner fittings on the container, to lift it, lower it and release it. In this description, the term spreader 55 is used to denote a part of a lifting device that is in direct contact with a container 21. Spreaders 55 are normally designed to handle more than one size of container, typically 20-40 ft. (6.096-12.192 m) or 20-40-45 ft. (6.096-12.192-13.716 m) long containers. Some spreaders 55 may at any time lift and handle one single 40 ft. (12.192 m) or a 45 ft. (13.716 m) container or two 20 ft. (6.096 m) containers. Some spreaders 55 are adjustable in use so that the same spreader 55 can be used to pick up one 20 ft. (6.096 m), or two 20 ft. (6.096 m) containers at a time by adjusting the length of the spreader. Alternatively, the use of tandem spreaders yield the possibility of lifting two containers in one move.

The container crane 51 can thus be used to lift a container 21 up from a ship and land it on a chassis 59, or vice versa. Alternatively, the container crane 51 can be used to transfer the container 21 between the ship and ground or a container stack or any other suitable container movement.

A container crane control system 1 is used to control the operation of the crane 51. In order to allow remote control of the crane 51, e.g. from an office 7, the container crane control system 1 comprises several cameras 10a-10b (shown in more detail in FIG. 3 and explained below) and a control device 15.

The cameras 10a-10b can be digital cameras comprising a respective video output 25 for providing a respective video stream 17. Moreover, each camera comprises a respective control signal input 26. The cameras 10a-10b are used to capture images containing at least part of the spreader 55 and any carried load 21. The video output 25 can be of any suitable type, and can e.g. comprise a video connector for any one of HD-SDI (High Definition Serial Digital Interface), HDMI (High Definition Multimedia Interface, DVI (Digital Video Interface), DisplayPort, VGA (Video Graphics Array), component video, composite video, Ethernet, etc. The video stream 17 is a representation of a series of images. The video stream 17 can be in the form of a compressed video stream or uncompressed video stream. Some examples for transferring video streams can apply here e.g. H.264, H.265, etc.

Optionally, camera control signals provided on the control signal input 26 controls any one or more of a tilt (i.e. a rotation along a substantially vertical axis) of the respective camera 10a-10b, a pan and a zoom level of the respective camera 10a-10b.

The control device 15 is any suitable control device capable of performing logic operations and can comprise any combination of a central processing unit (CPU), a graphics processing unit (GPU), a microcontroller unit (MCU), an application specific integrated circuit (ASIC), a field programmable gate array (FPGA), and discrete logic circuitry, optionally combined with persistent memory (e.g. read only memory, ROM).

An operator terminal 12 forms part of the container crane control system 1 and is connected to the cameras 10a-10b and the control device 15, e.g. over an IP (Internet Protocol) link, over a wired (e.g. Ethernet) or wireless (e.g. any of the IEEE 802.11 standards) interface. The operator terminal 12 can e.g. be a stationary or laptop computer or any other suitable device configured to receive and present the video stream and to allow user input. The operator terminal 12 is thus configured to receive the video stream for presentation to an operator 5. Moreover, the operator 5, based on the displayed video stream, can provide input to the operator terminal 12 for controlling the crane. This results in a crane control signal 16 for provision to the control device 15. The control device 15 receives the crane control signal 16 from the operator terminal 12 and provides a corresponding control signal 16' to control crane operation, thereby affecting motors of the crane 51, e.g. to lift or lower the container 21 or to move the trolley 53. Optionally, the control device 15 physically forms part of the operator terminal 12.

According to embodiments presented herein, a video device 11 forms part of the container crane control system 1. The video device 11 takes one or more video streams 17 as input from the camera(s) 10a-10b and modifies the images as explained in more detail below. The video device 11 also receives work order data 7 from a logistics control system 6.

Figure 3:
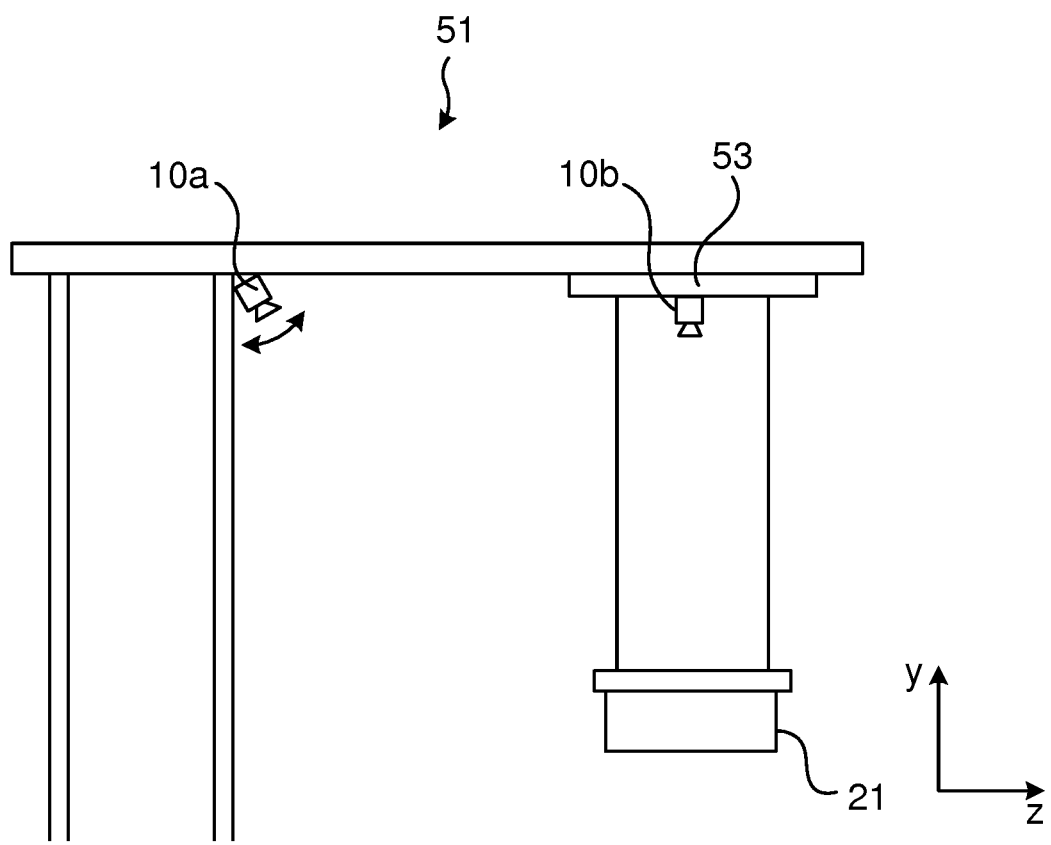
FIG. 3 is a schematic diagram illustrating camera placement in the container crane control system of FIG. 1 according to one embodiment.

FIG. 3 is a schematic diagram illustrating camera placement in the container crane control system of FIG. 1 according to one embodiment. The view is along a z-y plane in the same coordinate system as for FIG. 1. Hence, the view of FIG. 3 is from the side whereas the view in FIG. 1 is from the front (or back).

There is a first camera 10a provided on the crane, and a second camera 10b provided on the trolley 53.

Both cameras 10a, 10b provide video streams that can be selectively presented or combined by the video device (11 of FIG. 2).

It is to be noted that while two cameras are shown in FIG. 3, the container crane control system can be provided with any suitable number of cameras.

Figure 4:
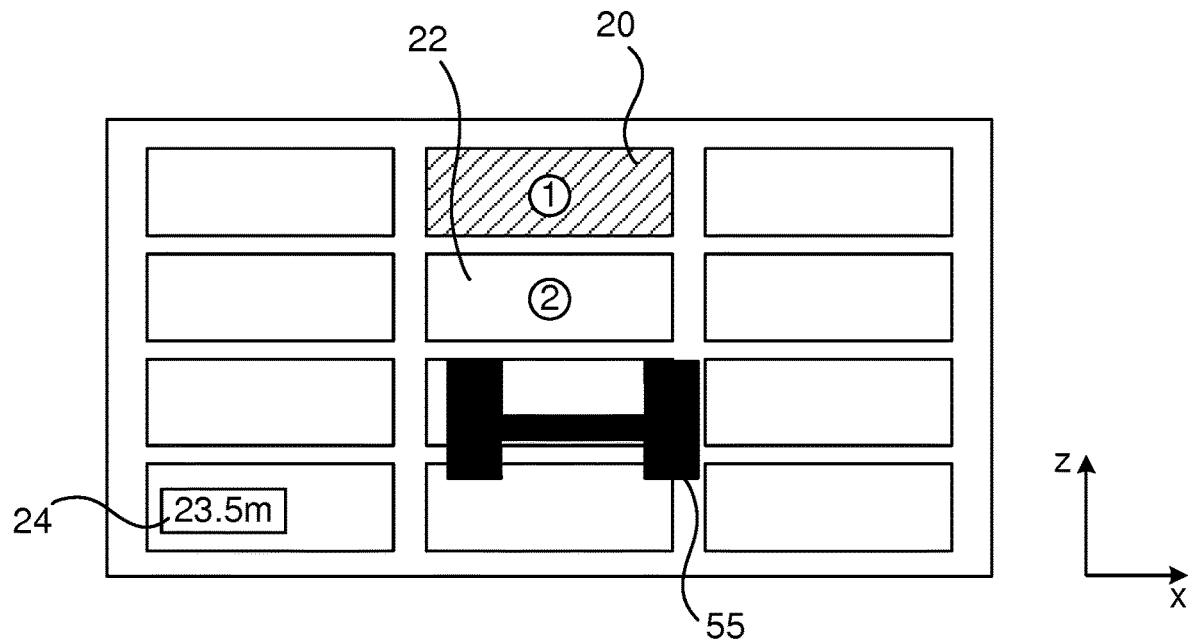
FIG. 4 is a schematic diagram illustrating a first operator view according to one embodiment.

FIG. 4 is a schematic diagram illustrating a first operator view according to one embodiment. The view is along an x-z plane in a Cartesian coordinate system. In other words, the view is from above. This view is presented to an operator of the container control system in the form of a video stream of images. FIG. 4 illustrates one such image, i.e. a snapshot, of the video stream.

The base source of the video stream is a video camera, e.g. the second camera 10b of FIG. 3. In the image you can see containers from above and the spreader 55. According to embodiments presented herein, the video stream is modified to add highlights, etc. For instance, the container 20 to be picked up is highlighted in the image. This can be done e.g. by any one or more of adding a pattern, a color, framing the container, animating the container with blinking, etc. Also, a text can be added to the image, e.g. the number one to indicate that this is the first container to be picked up.

Optionally, the location of a subsequent container 22 to be picked up is indicated to prepare the operator for the subsequent move. Also, height information 24 can be shown, indicating a height between the spreader and the nearest object below the spreader.

Figure 5:
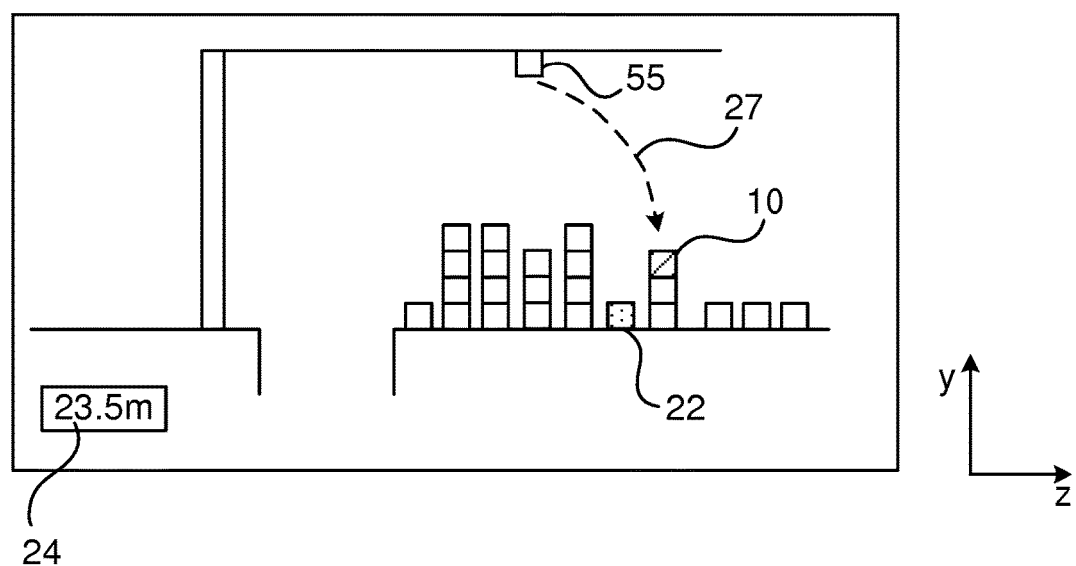
FIG. 5 is a schematic diagram illustrating a second operator view according to one embodiment.

FIG. 5 is a schematic diagram illustrating a second operator view according to one embodiment. The view is along a z-y plane in a Cartesian coordinate system. In other words, the view is from the side. This view is presented to an operator of the container control system in the form of a video stream of images. FIG. 5 illustrates one such image, i.e. a snapshot, of the video stream.

The base source of the video stream is a video camera, e.g. a side view camera. The containers can here be seen from the side. As for the top view of FIG. 4, the video stream is modified to add highlights, etc. For instance, the container 20 to be picked up is highlighted in the image. This can be done e.g. by any one or more of adding a pattern, a color, framing the container, etc. Also, a text can be added to the image, e.g. the number one to indicate that this is the first container to be picked up. Optionally, the location of a subsequent container 22 to be picked up is indicated. Also, height information 24 can be shown, indicating a height between the spreader and the nearest object below the spreader. In this view, a trajectory recommendation 27 of the spreader 55 is also shown to guide the operator when controlling the spreader 55.

In order to highlight information, a three dimensional container model of all containers can be obtained. The model can be obtained using triangulation where a surface point can be estimated in three dimensions, given an observation of the same point from two different positions.

In one embodiment, Structure From Motion (SFM) estimation from camera data of multiple views are used, either through motion over time or different cameras viewing the same structure. If metric reconstruction is desired, there is a need to obtain a calibration of the cameras. A standardized view of container surfaces could be used as a standard calibration pattern for the calibration to be estimated. This would yield a reasonably dense point cloud of the container model with optical characteristic taken from pixel data of the images.

In one embodiment, Lidar sensors are used. Lidar sensor are in themselves three dimensional sensors but have the weakness of not knowing the visual characteristics of the three dimensional points. However, using a combination of cameras and Lidar sensors would yield a dense container model with optical characteristics included.

In one embodiment, containers and their position are recognized on the video stream via sensor and data fusion, and trajectory forecasting. This achieves a calibration like property that enables a metric SFM reconstruction of the container surface positions.

Alternatively or additionally, a Lidar sensor together with multiple cameras are used as input for fusing the visual characteristics from the camera with the depth data of the Lidar sensor, to yield a similar output as the one given from the SFM approach.

Irrespectively of which approach is taken to give the point cloud of the container model, the observed/estimated container model is estimated from SFM/Lidar to provide a three dimensional of the containers, made available in the terminal operation system (TOS).

This accurate model construction complements a more sparse ship profile system (SPS), enabling higher safety levels when combined with relevant hardware design. This provides an important step towards a breakthrough ability of complete automation of the container cranes. Additionally, an accurately registered container model would give the possibility of providing AR (Augmented Reality)/VR (Virtual Reality) capability to the remote operator enabling more efficient container handling when running in remote operation. Building an accurate container model would also enable the detection of mismatches between the TOS data and the actual container profile.

Figure 6:
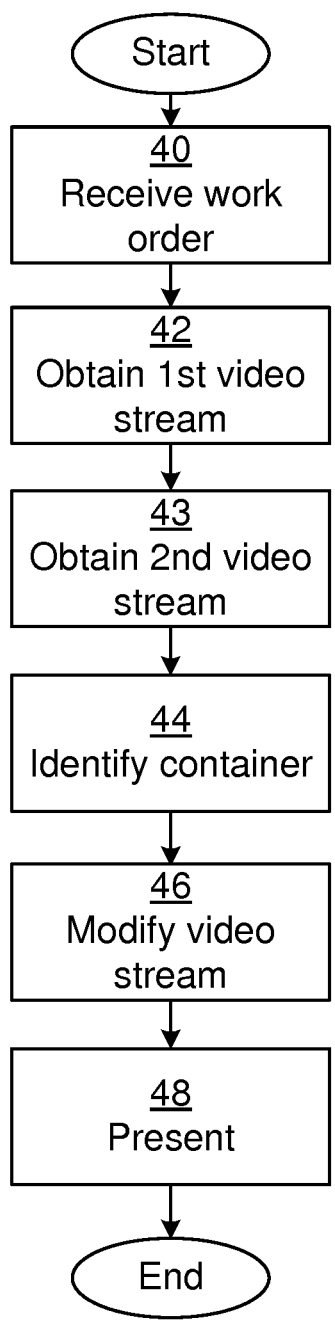
FIG. 6 is a flow chart illustrating a method for supporting remote control of a container crane.

FIG. 6 is a flow chart illustrating a method for supporting remote control of a container crane. As explained above, the container crane is configured to move containers from one location to another. The method is performed in the container crane control system (see 1 of FIG. 1 and FIG. 2).

In a receive work order step 40, work order information is received. Each work order specifies a location of a container to be picked up and a destination of the container to be placed.

In an obtain 1st video stream step 42, a first video stream of images of a pick-up location is obtained. The source of the first video stream is a camera.

In an optional obtain 2nd video stream step 43, a second video stream is obtained. The source of the second video stream is a camera other than the camera being the source for the first video stream.

In an identify container step 44, the container to be picked up is identified in the images of the first video stream.

In a modify video stream step 46, the first video stream images are modified. This comprises highlighting the container to be picked up.

Optionally, the location of a subsequent container to be picked up is indicated in the first video stream images.

When the second video stream is available, the first video stream can be combined with at least part of the second video stream to a combined video stream. Image processing may be necessary to align the images of the two video streams. The second video stream shows the container to be picked up but from a different angle than the first video stream. Hence, the combined video stream allows containers to be seen which are blocked, in the first video stream, by a spreader of the container crane. Optionally, this comprises making the spreader semi-transparent in the combined video stream.

Any one or more of other pieces of information can be added to the first video stream. For instance, height information, indicating a height between the spreader and an object below, can be added to the first video stream. Alternatively or additionally, wind information (e.g. direction and wind speed), a trajectory recommendation of the spreader, distance between the spreader and the container to be picked up can be added.

This step optionally comprises highlighting corner casting holes of the container to be picked up, which helps the operator to position the crane properly.

This step optionally comprises highlighting a fixed structure matching predetermined criteria. For instance, walkways, or other structures being higher up than ground can be identified and highlighted.

This step optionally comprises highlighting an anomaly compared to an expected structure. The anomaly can e.g. be a discrepancy between the container stacks of the image compared to a system representation of the same container stack.

This step optionally comprises highlighting moving objects. This allows the operator to be especially careful around such moving objects, such as vehicles, people, etc.

In a present step 48, the modified video stream of images is presented on a display of an operator terminal.

Figure 7:
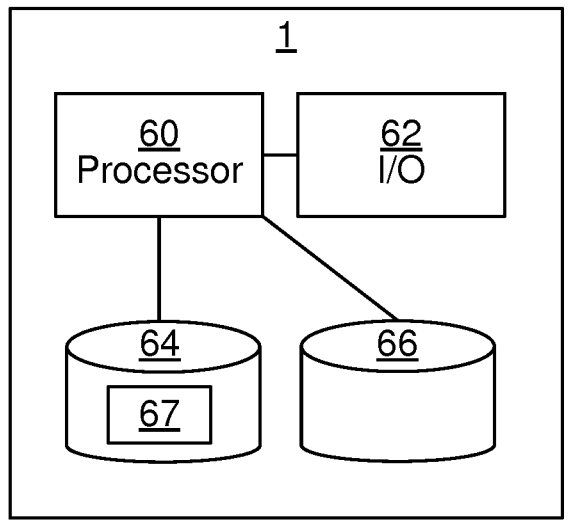
FIG. 7 is a schematic diagram illustrating components of the container crane control system of FIG. 1.

FIG. 7 is a schematic diagram illustrating components of the container crane control system 1 of FIG. 1. A processor 60 is provided using any combination of one or more of a suitable central processing unit (CPU), graphics processing unit (GPU), multiprocessor, microcontroller, digital signal processor (DSP), application specific integrated circuit (ASIC), etc., capable of executing software instructions 67 stored in a memory 64, which can thus be a computer program product. The processor 60 can be configured to execute the method described with reference to FIG. 6 above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

The container crane control system 1 further comprises an I/O interface 62 for communicating with other external entities. Optionally, the I/O interface 62 also includes a user interface.

Other components of the container crane control system 1 are omitted in order not to obscure the concepts presented herein.

Figure 8:
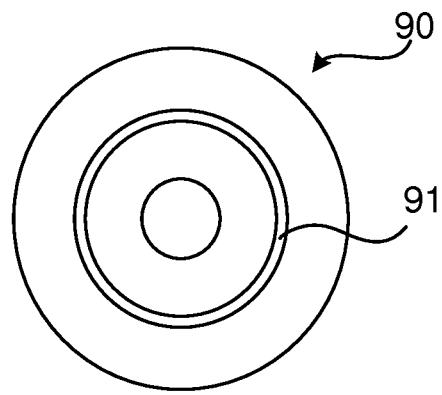
FIG. 8 shows one example of a computer program product comprising computer readable means.

FIG. 8 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 67 of FIG. 7. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for supporting remote control of a container crane, the container crane being configured to move containers from one location to another, the method being performed in a container crane control system, and comprising the steps of:
receiving work order information, each work order specifying a location of a container to be picked up and a destination of the container to be placed;
obtaining a first video stream of images of a pick-up location;
identifying the container to be picked up in the images of the first video stream;
modifying the first video stream images, which includes highlighting the container to be picked up; and
presenting the modified video stream of images on a display.

2. The method according to claim 1, wherein the step of modifying the first video stream images includes indicating the location of a subsequent container to be picked up.

3. The method according to claim 1, further comprising the step of:
obtaining a second video stream;
and wherein the step of modifying the first video stream includes combining the first video stream with at least part of the second video stream to a combined video stream, wherein the combined video stream allows containers to be seen which are blocked, in the first video stream, by a spreader of the container crane.

4. The method according to claim 3, wherein the step of modifying the first video stream includes making the spreader semi-transparent.

5. The method according to claim 1, wherein the step of modifying the first video stream images includes adding height information, indicating a height between the spreader and an object below.

6. The method according to claim 1, wherein the step of modifying the first video stream images includes adding wind information.

7. The method according to claim 1, wherein the step of modifying the first video stream images includes adding a trajectory recommendation of the spreader.

8. The method according to claim 1, wherein the step of modifying the first video stream images includes adding information about distance or key distances between the spreader and the container to be picked up.

9. The method according to claim 1, wherein the step of modifying the first video stream images includes highlighting corner casting holes of the container to be picked up.

10. The method according to claim 1, wherein the step of modifying the first video stream images includes highlighting a fixed structure matching predetermined criteria.

11. The method according to claim 1, wherein the step of modifying the first video stream images includes highlighting an anomaly compared to an expected structure.

12. The method according to claim 1, wherein the step of modifying the first video stream images includes highlighting moving objects.

13. A container crane control system for supporting remote control of a container crane, the container crane being configured to move containers from one location to another, the container crane control system comprising:
a processor; and
a memory storing instructions that, when executed by the processor, cause the container crane control system to:
receive work order information, each work order specifying a location of a container to be picked up and a destination of the container to be placed;
obtain a first video stream of images of a pick-up location;
identify the container to be picked up in the images of the first video stream;
modify the first video stream images, which includes highlighting the container to be picked up; and
present the modified video stream of images on a display.

14. A computer program for supporting remote control of a container crane, the container crane being configured to move containers from one location to another, the computer program comprising computer program code which, when run on a container crane control system causes the container crane control system to:
receive work order information, each work order specifying a location of a container to be picked up and a destination of the container to be placed;
obtain a first video stream of images of a pick-up location;
identify the container to be picked up in the images of the first video stream;
modify the first video stream images, which includes highlighting the container to be picked up; and
present the modified video stream of images on a display.

15. A computer program product comprising a computer program according to claim 14 and a computer readable means on which the computer program is stored.

\* \* \* \* \*